Patented Mar. 9, 1926.

1,575,778

UNITED STATES PATENT OFFICE.

LESTER J. MALONE AND STEWART J. CARROLL, OF ROCHESTER, NEW YORK, ASSIGNORS TO EASTMAN KODAK COMPANY, OF ROCHESTER, NEW YORK, A CORPORATION OF NEW YORK.

CELLULOSE ACETATE COMPOSITION AND METHOD OF MAKING THE SAME.

No Drawing.    Application filed August 2, 1920.    Serial No. 400,703.

*To all whom it may concern:*

Be it known that LESTER J. MALONE and STEWART J. CARROLL, citizens of the United States of America, residing at Rochester, in the county of Monroe and State of New York, have invented certain new and useful Improvements in Cellulose Acetate Compositions and Methods of Making the Same, of which the following is a full, clear, and exact specification.

This invention relates to a new cellulose acetate composition and a new method of making the same, whereby cellulose acetate is combined with castor oil, so that the resulting product can be used advantageously in the plastic and analogous arts, such, for instance, as sheet or film manufacture and varnish manufacture.

One object of our invention is to provide a composition of matter which may be made into transparent flexible sheets having all of the necessary and desirable qualities for use in photographic film manufacture and similar plastic arts. Another object of our invention is to provide a process which will yield a product having the necessary qualities. Further objects will hereinafter appear.

Castor oil has been used in nitrocellulose plastics to induce flexibility, but when added to cellulose acetate compositions (such, for example, as the acetone-soluble cellulose acetates of the type indicated in U. S. reissued Patent No. 12,637, Miles, Apr. 23, 1907) in amounts sufficient to enhance the flexibility, it has heretofore impaired the transparency of the product unless inflammable nitrocellulose be pre-mixed with the oil. We have discovered that a cellulose acetate composition containing castor oil, but free from cellulose nitrate, may be prepared so as to yield flexible, transparent film if the castor oil be separately pre-mixed with certain transparency-inducing substances and then the mixture be incorporated into a flowable solution of cellulose acetate. Such substances are indicated by the following examples,—acetylene tetrachlorid, methyl alcohol, methyl salicylate, and tricresyl phosphate.

In carrying out one illustration of our invention, we dissolve 100 parts of cellulose acetate in 300 parts of acetone. We separately mix together thoroughly 1 to 4 parts of castor oil with 10 to 40 parts of acetylene tetrachlorid. The latter mixture is then thoroughly incorporated with the solution until a homogeneous composition is obtained.

We may take, in another form of our invention, 100 parts of cellulose acetate and dissolve them in 300 parts of acetone. We separately form a mixture of 1 to 4 parts of castor oil and 10 to 30 parts of methyl salicylate. This mixture is then thoroughly incorporated into the solution.

In a still different embodiment of our invention we mix 100 parts of cellulose acetate with 300 parts of acetone, and then separately incorporate 1 to 3 parts of castor oil in 10 to 40 parts of methyl alcohol. The latter mixture is thoroughly incorporated with the solution.

In still another illustrative embodiment of our invention we dissolve 100 parts of cellulose acetate in 300 parts of acetone. We separately incorporate 2 parts of castor oil with 25 parts of tricresyl phosphate and then combine the latter mixture homogeneously with the solution.

The above four examples yield compositions which are sufficiently viscous to be properly flowed during sheet or film manufacture, the volatile ingredients passing off after flowing, but not too rapidly to impair the product, under the conditions usual in the art. Castor oil is left in the film in sufficient quantity to usefully increase its flexibility, yet the transparency of the film is not appreciably impaired. In the case of the less volatile transparency-inducing substances appreciable and useful amounts of them may remain in the film. The acetylene tetrachlorid and the tricresyl phosphate, when left in the film, tend to decrease the already small inflammability of the cellulose acetate composition.

It will be readily understood that the viscosity of the solutions can be usefully regulated by varying the amount of acetone. While we have hereinabove described certain compositions and processes by way of example, our invention is not restricted to the details of such illustrations.

Having thus described our invention, what we claim as new and desire to secure by Letters Patent is:

1. A flowable composition for the manufacture of transparent flexible films, comprising acetone-soluble cellulose acetate, a solvent therefor, castor oil, and a transparency-inducing substance, said composition being substantially free from nitrocellulose.

2. A flowable composition for the manufacture of transparent flexible films, comprising acetone-soluble cellulose acetate, acetone, castor oil, and acetylene tetrachlorid.

3. A composition of matter comprising acetone-soluble cellulose acetate 100 parts, sufficient solvent to make a flowable solution of the cellulose acetate, 1 to 4 parts of castor oil and 10 to 40 parts of a transparency-inducing substance, said composition being substantially free from nitrocellulose.

4. A composition of matter comprising acetone-soluble cellulose acetate 100 parts, acetone 300 parts, castor oil 4 parts, and acetylene tetrachlorid 40 parts.

5. In the manufacture of transparent film, the steps of first making a mixture of castor oil and a transparency-inducing substance and then incorporating said mixture into a flowable solution of acetone-soluble cellulose acetate, substantially free from nitrocellulose.

6. In the manufacture of transparent film, the steps of first making a mixture of castor oil and acetylene tetrachlorid and then incorporating said mixture into an acetone solution of cellulose acetate.

7. In the manufacture of transparent film, the steps of making a mixture of 1 to 4 parts of castor oil with 10 to 40 parts of a transparency-inducing material and then incorporating said mixture with a flowable solution containing 100 parts of cellulose acetate, said ingredients being substantially free from nitrocellulose.

8. A transparent flexible flowed cellulosic film containing castor oil and in which the cellulosic material consists entirely of acetone-soluble cellulose acetate.

9. A transparent flexible flowed film substantially free from nitrocellulose comprising acetone-soluble cellulose acetate, castor oil, and a transparency-inducing substance.

10. A strong, flexible, transparent film in which the sole cellulosic compound is acetone-soluble cellulose acetate, said film comprising, in addition to said acetate, sufficient castor oil to enhance the flexibility of the film and a substance which both reduces the inflammability of the film and prevents impairment of transparency by said oil.

Signed at Rochester, New York, this 26th day of July 1920.

LESTER J. MALONE.
STEWART J. CARROLL.